(12) United States Patent
Goh

(10) Patent No.: US 9,597,735 B2
(45) Date of Patent: Mar. 21, 2017

(54) TWIST DRILL AND METHOD OF DRILLING COMPOSITE MATERIALS, USE AND METHOD REGRINDING AND MANUFACTURING THEREOF

(75) Inventor: Wan Tsin Goh, Coventry (GB)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 14/128,140

(22) PCT Filed: Jun. 29, 2012

(86) PCT No.: PCT/GB2012/051525
§ 371 (c)(1),
(2), (4) Date: Dec. 20, 2013

(87) PCT Pub. No.: WO2013/005010
PCT Pub. Date: Jan. 10, 2013

(65) Prior Publication Data
US 2014/0169898 A1    Jun. 19, 2014

(30) Foreign Application Priority Data
Jul. 6, 2011    (GB) .................................... 1111596.1

(51) Int. Cl.
*B23B 51/02*    (2006.01)
*B23B 35/00*    (2006.01)
(Continued)

(52) U.S. Cl.
CPC .............. *B23B 51/02* (2013.01); *B23B 35/00* (2013.01); *B23P 15/32* (2013.01); *B24B 3/26* (2013.01);
(Continued)

(58) Field of Classification Search
CPC ............ B23B 2251/14; B23B 2251/18; B23B 2251/043; B23B 51/02; B23B 2215/04;
(Continued)

(56) References Cited

U.S. PATENT DOCUMENTS 2,328,629 A * 9/1943 Eich et al. .................. 408/230
4,065,224 A * 12/1977 Siddall .......................... 408/230
(Continued)

FOREIGN PATENT DOCUMENTS

CN    1148533 A    4/1997
EP    1260338 A2    11/2002
(Continued)

*Primary Examiner* — Daniel Howell
*Assistant Examiner* — Yasir Diab
(74) *Attorney, Agent, or Firm* — Corinne R. Gorski

(57) ABSTRACT

A twist drill for drilling composite materials includes a shank; a drill body; a drill tip having a cutting edge, a chisel edge, and a secondary chisel edge, wherein the secondary chisel angle of the drill tip is 145° to 165 and the point angle is 70° to 100°; and a flute extending from the drill tip to the drill body. The flute has a constant helix, and the helix angle of the flute being selected from the range 45° to 55°. A method of drilling a composite material comprising fibers uses the twist drill of the present embodiment. Suitably, the composite material is carbon fiber reinforced plastic or glass fiber reinforced plastic, and optionally being a laminate material such that the method comprises stack drilling. Embodiments achieve a combination of good hole quality, good tool life and good hole size spread.

13 Claims, 6 Drawing Sheets

(51) Int. Cl.
*B23P 15/32* (2006.01)
*B24B 3/26* (2006.01)

(52) U.S. Cl.
CPC ..... *B23B 2226/275* (2013.01); *B23B 2251/04* (2013.01); *B23B 2251/043* (2013.01); *B23B 2251/18* (2013.01); *Y10T 408/03* (2015.01); *Y10T 408/9097* (2015.01)

(58) Field of Classification Search
CPC ........... B23B 2226/275; B23B 2226/27; Y10T 408/9097; Y10T 408/909
See application file for complete search history.

(56) References Cited

U.S. PATENT DOCUMENTS

| | | | | |
|---|---|---|---|---|
| 4,556,347 A | * | 12/1985 | Barish | 408/230 |
| 4,789,276 A | * | 12/1988 | Clarke | 408/230 |
| 4,898,503 A | | 2/1990 | Barish | |
| 5,078,554 A | | 1/1992 | Kubota | |
| 5,217,332 A | * | 6/1993 | Takasaki et al. | 408/145 |
| 5,690,003 A | | 11/1997 | Resendez | |
| 5,716,170 A | | 2/1998 | Kammermeier et al. | |
| 6,132,149 A | * | 10/2000 | Howarth et al. | 408/230 |
| 6,652,203 B1 | * | 11/2003 | Risen, Jr. | 408/225 |
| 6,739,809 B2 | * | 5/2004 | Shaffer | 408/230 |
| 2003/0175086 A1 | * | 9/2003 | Muhlfriedel et al. | 408/230 |
| 2008/0019787 A1 | * | 1/2008 | Sampath et al. | 408/230 |
| 2009/0087275 A1 | * | 4/2009 | Goulbourne | 408/230 |
| 2010/0316456 A1 | * | 12/2010 | George | 408/230 |
| 2013/0039709 A1 | * | 2/2013 | Goh et al. | 408/1 R |

FOREIGN PATENT DOCUMENTS

| | | | |
|---|---|---|---|
| JP | 56095526 A | * | 8/1981 |
| JP | H02298408 A | | 12/1990 |
| WO | 89/08520 A1 | | 9/1989 |
| WO | 2008013725 A2 | | 1/2008 |

* cited by examiner

TWIST DRILL AND METHOD OF DRILLING COMPOSITE MATERIALS, USE AND METHOD REGRINDING AND MANUFACTURING THEREOF

RELATED APPLICATION DATA

This application is a §371 National Stage Application of PCT International Application No. PCT/GB2012/051525 filed Jun. 29, 2012 claiming priority of GB Application No. 1111596.1, filed Jul. 6, 2011.

TECHNICAL FIELD OF THE INVENTION

The present invention relates to twist drills and in particular twist drills adapted for drilling, especially automated drilling, of composite materials such as carbon fibre reinforced plastic (CFRP) or glass fibre reinforced plastic (GFRP).

BACKGROUND

Fibre-containing composite materials such as CFRP and GFRP represent a particular challenge, especially in terms of good hole quality. These materials are common materials for aircraft structure. These composite materials, particularly CFRP with twill fibre, unidirectional fibre layout, and materials with a glass cloth on the exit face, are notoriously difficult to drill and poor exit hole quality is the norm with conventional drills.

Some attempts have been made to address these drawbacks. In particular the present inventors suggested that a twist drill having a variable helix can be used to drill composite materials such as CFRP and GFRP to produce good exit hole quality (PCT/GB2011/000478). However, a twist drill having a variable helix can be complex to manufacture.

Typical tool life is 60 holes and so a considerable number of twist drills are used in the manufacture of aircraft and the like. Whilst hole quality is important such that comparatively complex geometry can be favoured if they perform well, there is nevertheless a desire to reduce costs where possible and to ensure a ready and rapid supply of replacement twist drills. Thus, improvements in tool life and/or unit cost are of interest.

Manufacturing drills with complicated geometries, like variable helix, require not only new modelling techniques but also new manufacturing methodology.

WO 2008/013725 (Kennametal) aims to provide a twist drill for drilling CFRP, with good exit hole quality and good tool life. WO 2008/013725 proposes a diamond coated twist drill made of tungsten carbide with 6 wt % cobalt, having a narrowly defined geometry including lip relief angle between 10° and 20°, a notch rake angle between −5° and 10°, a chisel length up to 0.035 mm and a point angle between 70° and 110°. Kennametal teaches that these features in combination provide a coated twist drill with good exit hole quality and good tool life.

SUMMARY OF THE INVENTION

At its most general, the present invention proposes that, surprisingly, excellent hole size spread, exit hole quality and tool life in fibre reinforced composite materials including CFRP and the like can be achieved with a twist drill having a comparatively simple geometry comprising the following features: a constant helix having a comparatively large helix angle, a small point angle and a large secondary chisel angle.

Twist drills embodying this combination of constant large helix, small point angle and a large secondary chisel angle have, as shown herein, good tool life, can be easily manufactured, and produce holes with exit holes having minimal defects and hole size spread with good tolerance.

In a first aspect the present invention provides a twist drill for drilling composite materials, the twist drill comprising:
 a shank;
 a drill body;
 a drill tip comprising a cutting edge, a chisel edge, and a secondary chisel edge, wherein the secondary chisel angle is 140° to 165°, the drill tip also having a point angle of 70° to 100°; and
 a flute extending from the drill tip to the drill body, the flute having a constant helix, the helix angle of the flute being selected from the range 45° to 55°.

The present inventors have found that surprisingly the combination of comparatively high angle constant helix and comparatively small point angle and the provision of a large angle secondary chisel edge provides a twist drill with good tool life, good exit hole quality and hole size spread with good tolerance when drilling composite materials containing fibres, for example epoxy or bismaleimide (BMI) based CFRP. Indeed the drill of this aspect is adapted for drilling such composite materials and an advantage is that embodiments of the drill perform well (good hole quality, hole size tolerance and tool life) for a wide range of fibre-containing composite materials, including CFRP with twill fibre or unidirectional fibre layout, and materials with a glass cloth on the exit face. In embodiments, the drill is a composite twist drill.

Nevertheless, the drill can be used for drilling other materials, for example steel and aluminum.

The helix is a constant helix. That is, the helix angle is constant from the drill tip and throughout the drill body, i.e. from the start of a flute to the end of the flute such that no part of the helix is variable.

Suitably the drill has a constant helix angle of at least 45°, preferably at least 46°, more preferably at least 47°, more preferably at least 48°, more preferably at least 49° and most preferably at least about 50°.

Suitably the drill has a constant helix angle of no more than 55°, preferably no more than 54°, more preferably no more than 53°, more preferably no more than 52°, more preferably no more than 51° and most preferably no more than about 50°.

These values (upper and lower limits) for the helix angle can be present in embodiments in any combination.

A particularly preferred helix angle is 45° to 55°, preferably about 47° to 53°, more preferably about 49° to 51° and most preferably about 50°.

The comparatively large constant helix angle assists in rapidly engaging with the material that is being drilled. In practice, embodiments rapidly and cleanly cut into a composite material containing fibres.

Suitably the drill tip comprises a chisel edge having a chisel edge angle of to 125°, more preferably 105° to 120° and most preferably 114° to 118°.

A comparatively large chisel edge angle as described herein has been found to assist in reducing thrust force.

Preferably the chisel edge length is 0.03 mm to 0.15 mm, more preferably 0.05 mm to 0.15 mm, more preferably 0.06 mm to 0.14 mm, more preferably 0.07 mm to 0.13 mm, more preferably about 0.08 mm to 0.12 mm, more preferably about 0.09 mm to 0.11 mm and most preferably about 0.1 mm.

A comparatively small chisel edge length as described herein has been found to assist in reducing thrust force.

The present inventors believe that a secondary chisel edge provides improvements in the cutting action by reducing the cutting resistance.

Suitably the drill has a secondary chisel angle of at least 140°, preferably at least 141°, more preferably at least 142°, more preferably at least 143°, more preferably at least 144° and most preferably at least about 145°.

Suitably the drill has a secondary chisel angle of no more than 165°, preferably no more than 164°, more preferably no more than 163°, more preferably no more than 162°, more preferably no more than 161°, more preferably no more than 160°, more preferably no more than 159°, more preferably no more than 158°, more preferably no more than 157°, more preferably no more than 156°, and most preferably no more than 155°.

These values (upper and lower limits) for the secondary chisel angle can be present in embodiments in any combination.

A particularly preferred secondary chisel angle is 140° to 165°, preferably 145° to 160° and most preferably 145° to 155°. An especially preferred value is about 146°.

By providing a secondary chisel edge as described herein, the present inventors have found that hole quality, especially exit hole quality, in composite materials described herein can be improved considerably. In particular, the provision of a large secondary chisel edge angle has been found to improve the cutting action of the drill, for example by reducing the cutting resistance which in turn reduces heating to avoid, for example, melting of resin.

The terms 'point' and 'point angle' are familiar to the person skilled in the art, as is the fact that point angles are regarded as positive, by convention. For example the point angle of an embodiment of the present invention is shown as feature 12 in FIG. 1. For the avoidance of doubt the point angle is the inclusive angle between the cutting edges measured along the drill axis.

Suitably the drill has a point angle of at least 70°, preferably at least 71°, preferably at least 72°, preferably at least 73°, more preferably at least 74°, preferably at least 75°, more preferably at least 76°, preferably at least 77°, more preferably at least 78°, preferably at least 79°, more preferably at least 80°, more preferably at least 81°, more preferably at least 82°, more preferably at least 83°, more preferably at least 84° and most preferably at least about 85°.

Suitably the drill has a point angle of no more than 100°, preferably no more than 99°, preferably no more than 98°, preferably no more than 97°, preferably no more than 96°, preferably no more than 95°, preferably no more than 92°, more preferably no more than 90°, more preferably no more than 89°, more preferably no more than 88°, more preferably no more than 87°, more preferably no more than 86°, and most preferably no more than about 85°.

These values (upper and lower limits) for the point angle can be present in embodiments in any combination.

A particularly preferred point angle is 70° to 100°, more preferably 75° to 95°, more preferably 80° to 90°, more preferably 83° to 88°, more preferably 85° to 88° and most preferably about 85°.

The present inventors have found that a point angle as described herein assists in reducing thrust force and/or producing good exit hole quality.

Suitably the drill tip comprises a primary facet extending behind the cutting edge and a secondary facet extending behind the primary facet.

Suitably the primary relief angle is less than 35°.
Suitably the secondary relief angle is less than 35°.
Preferably the relief angle of the primary facet (primary relief angle) is 15° to 25°, and the relief angle of the secondary facet (secondary relief angle) is 15° to 30°.

The provision of primary and secondary relief angles has been found to improve heat release at the drill tip. This has been found to improve hole quality, especially exit hole quality when drilling composite material as described herein. In particular, experiments conducted by the inventors have shown that less splintering of composite materials is observed.

Preferably the primary relief angle is at least 10° and more preferably at least 15°.

Preferably the primary relief angle is no more than 25° and more preferably no more than 20°.

These values (upper and lower limits) for the primary relief angle can be present in embodiments in any combination.

A particularly preferred primary relief angle is 15° to 25°.
Preferably the secondary relief angle is at least 15° and more preferably at least 20°.

Preferably the secondary relief angle is no more than 30° and more preferably no more than 25°.

These values (upper and lower limits) for the secondary relief angle can be present in embodiments in any combination.

A particularly preferred secondary relief angle is 20° to 25°.

Suitably the drill tip has an axial rake angle is 5° to 15°, preferably 5° to 8° and most preferably 5°.

The present inventors have found that an axial rake angle as described herein can reduce or minimise the amount of heat generated during cutting, thereby assisting the formation of good quality exit holes.

The drill can comprise a right hand or left hand helix. A right hand helix is preferred.

Preferably the twist drill has a straight cutting edge.
Suitably the twist drill has an edge correction to provide a straight cutting edge. Thus, in embodiments, as discussed below, the manufacture of the twist drill includes the step of edge correction.

Preferably the drill is an automated drill. That is, the drill is for automated drilling. Automated drilling is carried out with Computer-Numerical-Controlled (CNC) machine where the cutting speed and feed are pre-determined. Producing good hole quality in fibrous materials is notoriously challenging. This is particularly true both for woven and unidirectional type of materials as well as materials with an additional layer on the exit face such those with a glass scrim.

Preferably the twist drill has a diameter in the range 1 mm to 50 mm, preferably 1 to 20 mm, more preferably 1 mm to 15 mm, and most preferably 2 mm to 15 mm.

Preferably the twist drill is made of carbide. A preferred carbide is tungsten carbide (WC). Another preferred carbide is binderless carbide. Alternative materials of construction include high speed steel (HSS), HSCo and HSCoXP, silicon nitride and PCD (polycrystalline diamond), or combinations thereof (for example PCD mounted on a metal or carbide substrate, e.g. mounted on a HSS or carbide substrate), and any diamond impregnated substrates such as tungsten carbide and silicon carbide.

In the case of a carbide twist drill, preferably the carbide is a cemented carbide. Suitably the metal matrix is cobalt. That is, a carbide cobalt. Preferably the twist drill is made of tungsten-carbide cobalt. A particularly preferred concentration of cobalt is 3 wt % to 10 wt % cobalt based on weight of the total cemented carbide. In embodiments, 5 wt % to 7 wt % is used, optionally about 6 wt %. In other embodiments, about 10 wt % is preferred. In other embodiments, about 4.2 wt % is used.

In embodiments the twist drill is coated. The twist drill can be partially or fully coated. Preferably the coating is a wear resistant coating, suitably having a lower coefficient of friction than the uncoated tool.

Suitable coatings include metal nitride based coating (e.g. TiN, AlxTiyN, etc.), metal oxide based coating (e.g. AlxO, AlxCryO, etc.), carbon based coating (e.g. DLC, Diamond Coating, etc.) and combinations thereof.

In embodiments, diamond coating, suitably CVD diamond coating, is used. Suitably the diamond coating has a thickness of 5 to 15 µm, more preferably about 8 µm.

Suitably the drill is bright (uncoated).

Suitably the twist drill, for example an uncoated twist drill, has a tool life of at least 100 holes, preferably at least 150 holes, more preferably at least 200 holes, more preferably at least 250 holes, more preferably at least 300 and most preferably at least 360 holes.

Suitably the tool life is measured with a drill surface speed of 120 m/min and a feed rate of 0.08 mm/rev cutting CFRP materials with a thickness of around 10 mm.

Preferably hole size spread is within H9 hole size tolerance, more preferably within H8 hole size tolerance and most preferably within H7 hole size tolerance. H7 hole size tolerance indicates that the hole produced by the drill falls between the nominal size of the drill and 15 µm above the nominal drill diameter. For a drill with 6.35 mm in diameter, H7 would be between 6.35 mm and 6.365 mm (inclusive).

Without wishing to be bound by theory, the present inventors believe that the improvements in hole quality referred to herein are achieved, at least in part, by reducing the generation and/or build-up of heat during drilling. Excess heat causes the matrix of a composite material (typically a resin matrix) to soften or melt, which in turn permits the fibres in the composite to move or even separate from the matrix. This process can result in damage to the fibres and fraying of the composite material. In the context of laminate materials, this can also result in delamination.

For example, the present inventors have found that significant amounts of heat can be released by the use of the primary and secondary relief angles as described herein.

Indeed, as discussed below in more detail, embodiments of the present invention have required only low thrust force, thereby reducing the incidence of material delamination and reducing power consumption. Furthermore, excellent entry and exit hole quality has been achieved, particularly when cutting CFRP, with both twill fibre or uni-directional fibre layout, as well as materials with a glass cloth on the exit face. This a particularly important contribution to the art because the woven such as 2×2 twill, uni-directional type materials and those with a glass cloth on the exit face are notoriously difficult to drill and poor hole quality is the norm with conventional drills.

In a second aspect the present invention provides a method of drilling composite material comprising fibres, wherein the method includes the step of drilling the composite material using a twist drill according to the first aspect.

Suitably the composite material is made up of matrix, for example a plastics material (e.g. polymer), ceramic or metal matrix, which is reinforced by fibrous materials, for example carbon fibre or glass fibre.

Suitably the composite material comprise a plastics material matrix, preferably a polymer matrix, suitably a resin matrix. A particularly preferred matrix is selected from polyester, epoxy and bismaleimide (BMI).

Suitably the fibres, which typically function as fibrous reinforcement, are inorganic or organic fibres. Particularly preferred are glass fibres and carbon fibres.

Suitably the composite material is carbon fibre reinforced plastic (CFRP) or glass fibre reinforced plastic (GFRP). Suitably the materials are CFRP with twill fibre or unidirectional fibre layout, and materials with a glass cloth on the exit face.

The composite material can be a laminate material, or form part of a laminate material. The laminate material can comprise one or more of a metal layer, glass cloth layer, paint and copper mesh. These layers may be finishing layers.

For example, the laminate material can be a CFRP/Al material, i.e. comprising one or more layers of CFRP and one or more layers of Al. The drilling of such materials is also known as stack drilling.

The laminate material can be manufactured from either dry or pre-impregnated materials. The fibres of the composite material can be continuous or chopped fibres. Methods of manufacturing such materials include vacuum bag moulding, autoclave processing, resin transfer moulding and hand lay-up.

The twist drills of the present invention are also particularly suitable for use with laminates comprising more than two layers, e.g. three, four, five or six layers.

In this connection, reference to a laminate material includes reference to CFRP laminate and the like. For example, such materials can be made by taking fibre in a pre-impregnated stage, and using up to 50 of such plies to make a (e.g. 10 mm) CFRP laminate. In another example, the laminate is made up of chopped fibres, and, whilst there are in principle no layers because the chopped fibre will be incorporated into soft resin which will then cure to form a CFRP material, it is still known in the art as a laminate.

Suitably the composite material is an aircraft component (e.g. wing or fuselage panel), wind turbine component (e.g. wind turbine blade or housing), boat component or vehicle panel (e.g. car body panel). Indeed, the twist drill described herein is adapted for drilling any workpiece that comprises a composite material containing fibres. It can also be used in stack drilling such as CFRP/Aluminum i.e. CFRP/Al, CFRP/Stainless/Al, etc. A further example is sports equipment, where the composite materials are used to provide high strength with low weight.

The optional and preferred features associated with the first aspect also apply to this aspect.

In a third aspect the present invention provides use of a twist drill according to the first aspect in a method of automated drilling of a composite material as described herein.

As explained above, the twist drills described herein are adapted for automated drilling and embodiments provide significant advantages to the user in terms of tool life, exit hole quality and hole size spread.

The optional and preferred features associated with the first aspect also apply to this aspect.

In a fourth aspect, the present invention provides a regrinding method comprising the step of regrinding a twist drill so as to form a twist drill according to the first aspect.

Preferably the method of regrinding includes regrinding the point. Suitably, the regrinding method can be carried out two or more times, for example three times, on the same drill.

Suitably the method includes regrinding, where present, one or more of the chisel edge (suitably chisel edge length and/or chisel edge angle), secondary chisel edge (suitably secondary chisel edge angle), primary relief/clearance, secondary relief/clearance and rake angle.

Preferably all of chisel edge, secondary chisel edge, primary relief/clearance, secondary relief/clearance and rake angle are subjected to regrinding.

The optional and preferred features associated with the first aspect also apply to this aspect.

In a fifth aspect, the present invention provides a twist drill that is the product of the regrinding method of the fourth aspect.

In a sixth aspect, the present invention provides a method of making a twist drill according to the first aspect.

Suitably the method includes the step of machining a blank. Optionally, the method includes forming the blank from a rod, suitably by cutting the rod to the desired length, for example the length of the drill.

Suitably, the blanks are provided with a back taper.

Preferably the method includes the step of grinding a flute with a constant helix.

Suitably the method includes the step of producing the land by forming a body clearance along the or each flute.

Suitably the method includes the step of pointing, i.e. forming the point. Preferably this step includes forming a primary facet and a secondary facet.

Suitably the primary facet is formed so as to produce a chisel edge, preferably with a chisel edge angle of 105° to 125°.

Suitably the primary facet is formed so as to have a relief angle (also known as a clearance or clearance angle) of 10° to 25°, preferably 15° to 25°.

Suitably the method includes forming a secondary chisel edge. Preferably the secondary chisel edge has a secondary chisel angle of 140° to 165°.

Suitably the secondary facet is formed so as to have a relief angle (also known as a clearance or clearance angle) of, 15° to 30°, preferably 20° to 25°.

Suitably the method includes the step of gashing to create an axial rake angle. Suitably the axial rake angle is 5° to 15°, preferably 5° to 8°. Suitably the step of gashing creates a chisel edge length of 0.03 mm to 0.15 mm, preferably 0.05 mm to 0.15 mm.

Suitably the method includes a step of providing a straight cutting edge. Preferably the straight cutting edge is provided by an edge correction step.

In a seventh aspect the present invention provides a method of manufacturing a twist drill for drilling composite materials, the method comprising the steps of:
(i) fluting a drill blank to produce a helical flute with a constant helix angle in the range of 45° to 55° from the start to the end of the flute;
(ii) forming a cutting edge at the end of the flute;
(iii) pointing to form a point angle of 70° to 100°;
(iv) forming a secondary chisel angle in the range 140° to 165°.

The optional and preferred features of the sixth aspect also apply to the seventh aspect.

In an eighth aspect, the present invention provides a twist drill that is the product of the method of the sixth aspect.

In a ninth aspect, the present invention provides a twist drill that is the product of the method of the seventh aspect.

The optional and preferred features of any one aspect can also apply to any of the other aspects. Furthermore, any one aspect may be combined with one or more of the other aspects. In particular, features disclosed in the context of a product (twist drill) may also apply to a method as a corresponding method step and vice versa.

BRIEF DESCRIPTION OF THE DRAWINGS

Embodiments of the invention and experiments illustrating the advantages and/or implementation of the invention are described below, by way of example only, with respect to the accompanying drawings, in which.

DETAILED DESCRIPTION OF EMBODIMENTS AND EXPERIMENTS

Figure 1:
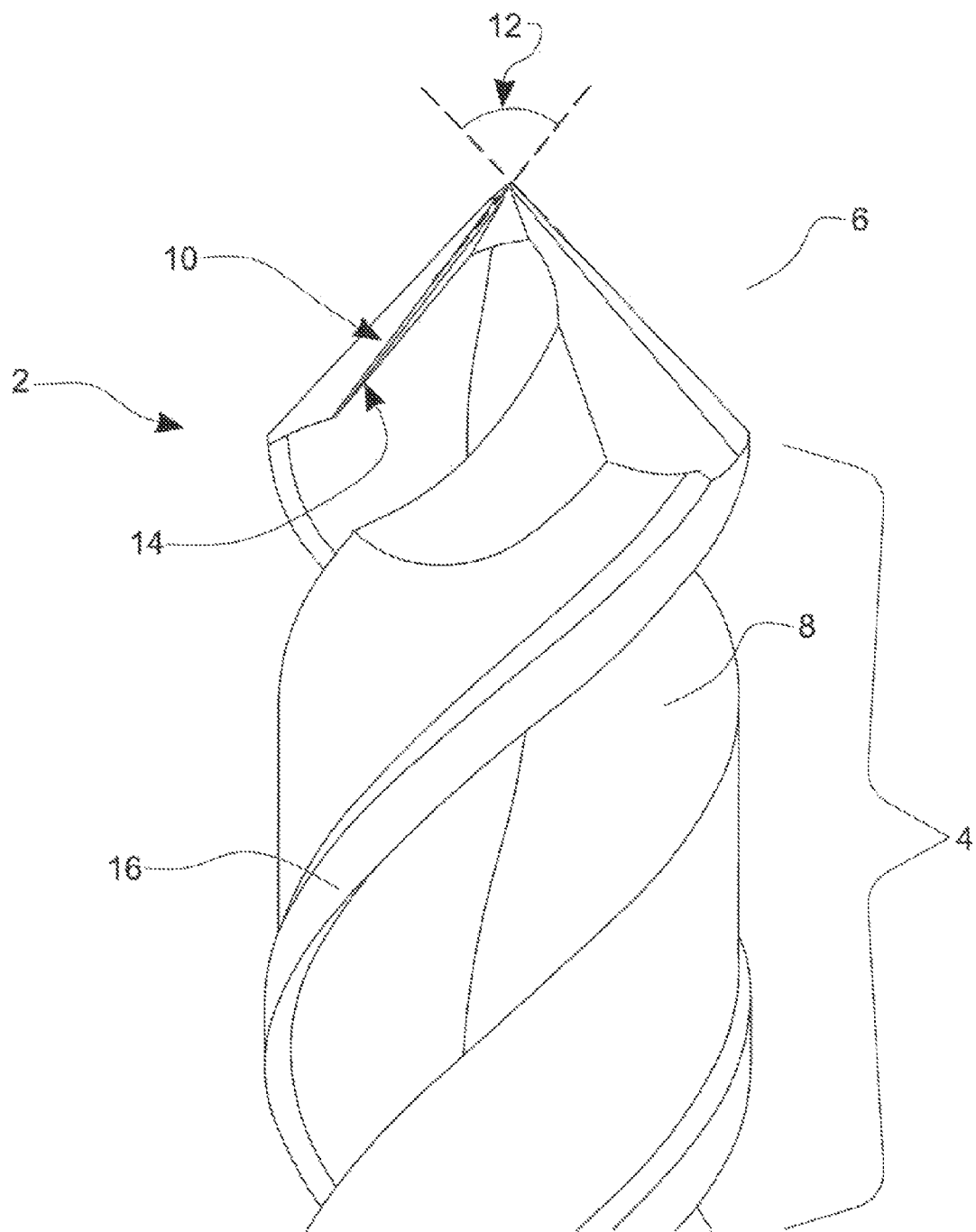
FIG. 1 shows a side view of a constant helix twist drill being an embodiment of the present invention.

FIG. 1 shows a twist drill 2 of the present invention. The drill comprises a shank (not shown), drill body 4 and drill tip 6. Two helical flutes 8 extend from the drill tip to the drill body. The helix angle is a constant helix angle of 50°, although other constant helix angles are possible, for example 45° to 55°.

The width of the flute is substantially constant along the length of the flute.

The primary and secondary cutting edges 10 (cutting lips) at the drill tip form the point, which has a point angle 12 of 85°. Other point angles are possible, for example 70° to 100°.

The cutting edge 10 of drill 2 was edge corrected to produce a straight cutting edge 10, an artefact of this edge correction can be seen in FIG. 1 as feature 14.

Drill 2 has body clearance 16 along the flutes 8.

Figure 2:
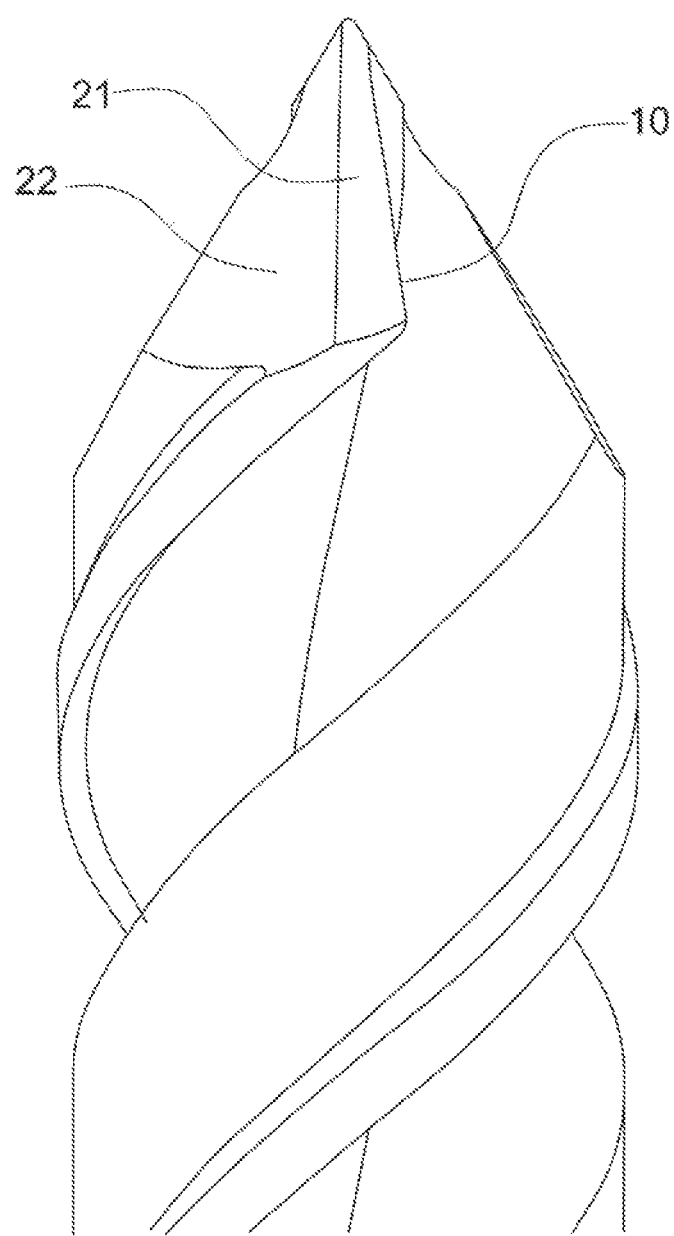
FIG. 2 shows a side view of a constant helix twist drill of FIG. 1 the first aspect of the present invention.

FIG. 2 shows a rotated side view of drill 2. The cutting edges of the point are provided with a primary relief 21 (also known as primary facet or flank face clearance) and secondary relief 22 (also known as secondary facet or flank face clearance). The respective relief angles (also known as clearance) are 10° and 20° respectively.

Figure 3A:
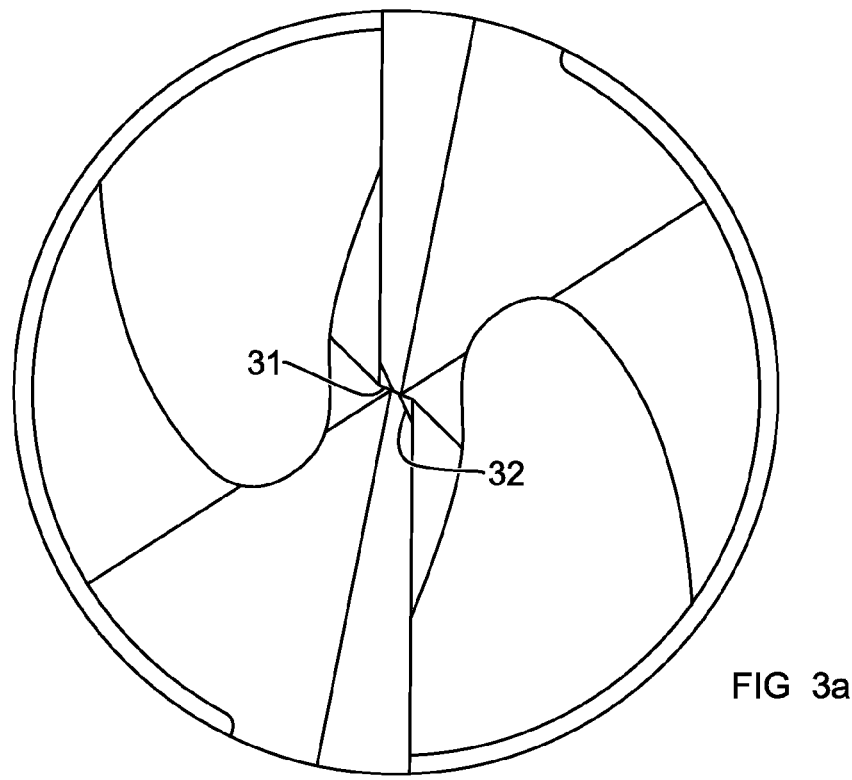
FIGS. 3A and 3B show end-on axial views of the twist drill of FIG. 1.
Figure 3B:
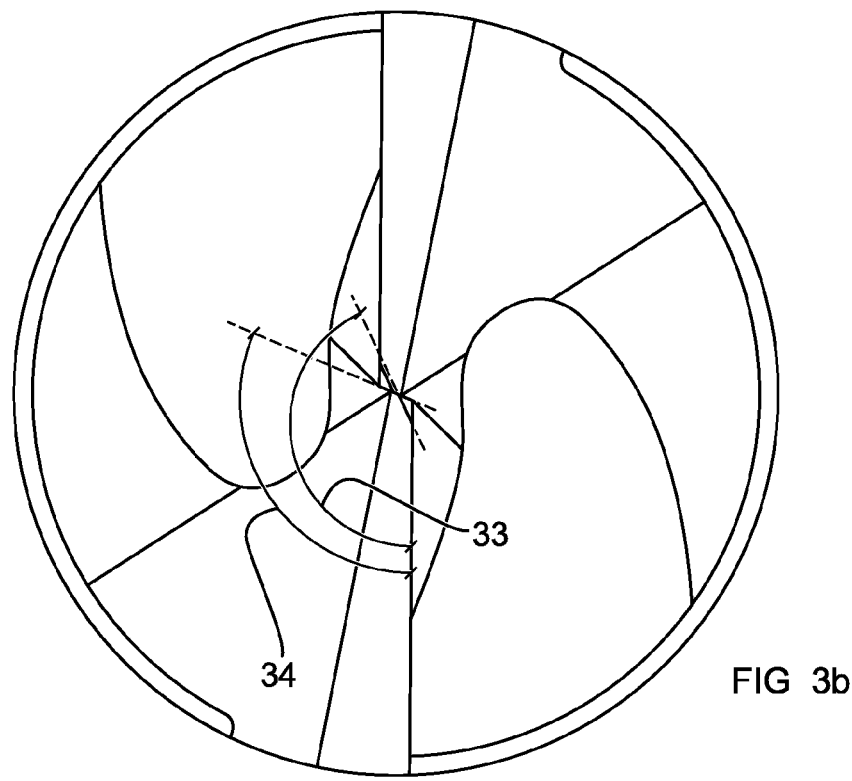

FIGS. 3A and 3B show axial views of drill 2. Chisel edge 31 has a length of 0.5 mm and a chisel angle 34 of 115°. Other chisel lengths and chisel angles are possible, as described herein.

The secondary chisel edge 32 is provided with a large secondary chisel angle 33 of 146°.

A characteristic of the drill 2 that makes it particularly effective at drilling composite material containing fibres is a secondary chisel edge. Furthermore, secondary chisel edge angle 33 is large, being 146°. Other secondary chisel edge angles are possible, for example 140° to 165°.

As described above, the combination of the constant large (quick) helix, specified point angle and the secondary chisel edge in particular impart the drill with unexpectedly good performance when cutting composite materials such as CFRP. Indeed, a highly desirable combination of good hole quality (little or no fraying of the material), good tool life, and hole size spread within H7 tolerance is achieved. The twist drill is also comparatively easy to manufacture (for example, as compared to a variable helix).

Testing of Drill Performance

The performance of an embodiment of the present invention was compared with a commercially available automated drill that is marketed for use with CFRP. The drill performance was quantified by measuring tool life, exit hole quality and hole size spread.

Test (1): Exit Hole Quality

In order to measure exit hole quality automated drilling was carried out on a test workpiece. The test workpiece for each test was a 10 mm thick epoxy based CFRP, with uni-directional fibres and a glass scrim. This configuration, which is encountered for example in the aerospace industry, represents a particularly difficult challenge.

Drill Geometry

A twist drill was manufactured in accordance with the methods described herein. Specifically, the following steps were undertaken:

1. Rods are cut into desired length which is the length of the drill
2. Blanks are back tapered.

Using a CNC machine, the following steps were performed:

3. Fluting to form two flutes 8 with a constant helix.
4. Fluting land is produced and body clearance 16 is generated along the flute.
5. Pointing to create the primary facet 21, the secondary facet 22 and the point with a point angle 12 of 85°. The primary facet is created to have a primary clearance of 10°. The secondary facet is created to have a secondary clearance of 20° and a secondary chisel angle of 146°.
6. Gashing is carried out to create a rake angle of 5°.

The completed drill had the following geometry:
Helix angle=50°
Point angle=85°
Axial rake angle=5°
Secondary chisel angle=146°.
Primary clearance=10°.
Secondary clearance=20°.

This drill is referred to as drill #1 for the purposes of the tests.

A commercially available automated drill was also tested: Drill #2.

Figure 4A:
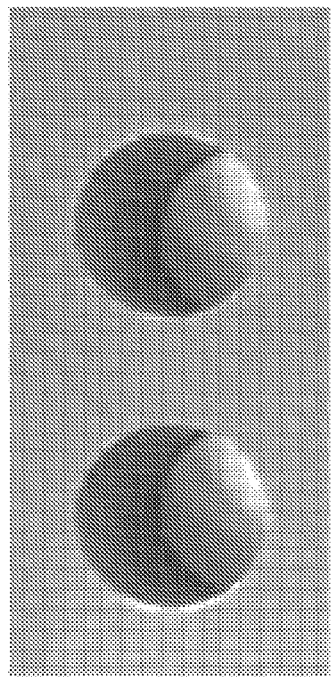
FIGS. 4A and 4B show the results of an exit hole quality test in a 10 mm thick epoxy based CFRP with a glass scrim for the embodiment of FIG. 1 of the present invention (4A), and a commercially available drill (4B)
Figure 4B:
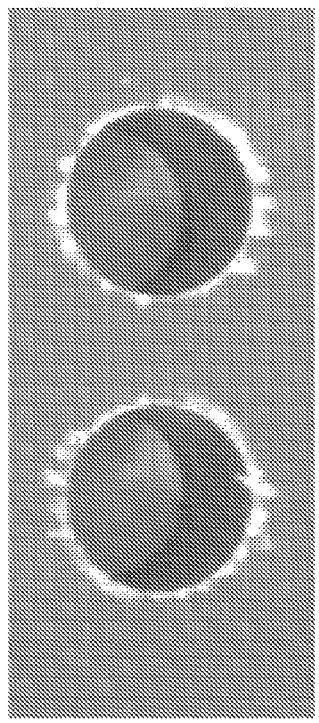

As can be seen from FIG. 4A the exit hole quality of drill #1 is excellent, far better than that produced by drill #2 (see FIG. 4B).

Test (2): Tool Life

Due to high strength and fibre reinforcement CFRP is extremely abrasive. The tool life of uncoated Drill #1 (as described above) was found to be significantly longer than that of uncoated Drill #2 (Drill #1 drilled 360 holes, compared to 140 for Drill #2).

Test (3): Spread in Hole Size

The twist drills used in this comparative test are identical except for their helix angle. Drill #A has a constant helix angle of 50°, Drill #B has a constant helix angle of 20°.

The performance of Ø6.35 mm diameter (the drill diameter is shown on FIGS. 5 and 6 by lines 51 and 61 respectively) drills with 20° constant helix (slow) and 50° constant helix (quick) were tested.

In order to measure the spread exit hole quality automated drilling was carried out using a test workpiece using three speeds and feeds. The test workpiece for each test was an 8 mm thick MTM 46 resin based CFRP, with unidirectional fibres. This configuration, which is encountered for example in the aerospace industry, represents a particularly difficult challenge.

Table 1 identifies the drill used for each test by helix angle and specifies the speed and feed used for each test.

TABLE 1 hole size spread test conditions

| Test | Helix angle | Speed (m/min) | Feed (mm/rev) |
|---|---|---|---|
| 1 | 50 | 80 | 0.04 |
| 2 | 20 | 200 | 0.04 |
| 3 | 50 | 80 | 0.13 |
| 4 | 50 | 200 | 0.04 |
| 5 | 20 | 130 | 0.04 |
| 6 | 50 | 80 | 0.08 |
| 7 | 20 | 80 | 0.08 |
| 8 | 50 | 200 | 0.13 |
| 9 | 50 | 130 | 0.08 |
| 10 | 50 | 130 | 0.04 |
| 11 | 20 | 200 | 0.08 |
| 12 | 20 | 130 | 0.13 |
| 13 | 20 | 130 | 0.08 |
| 14 | 20 | 80 | 0.13 |
| 15 | 20 | 200 | 0.13 |
| 16 | 50 | 200 | 0.08 |
| 17 | 50 | 130 | 0.13 |
| 18 | 20 | 80 | 0.04 |

Figure 5:
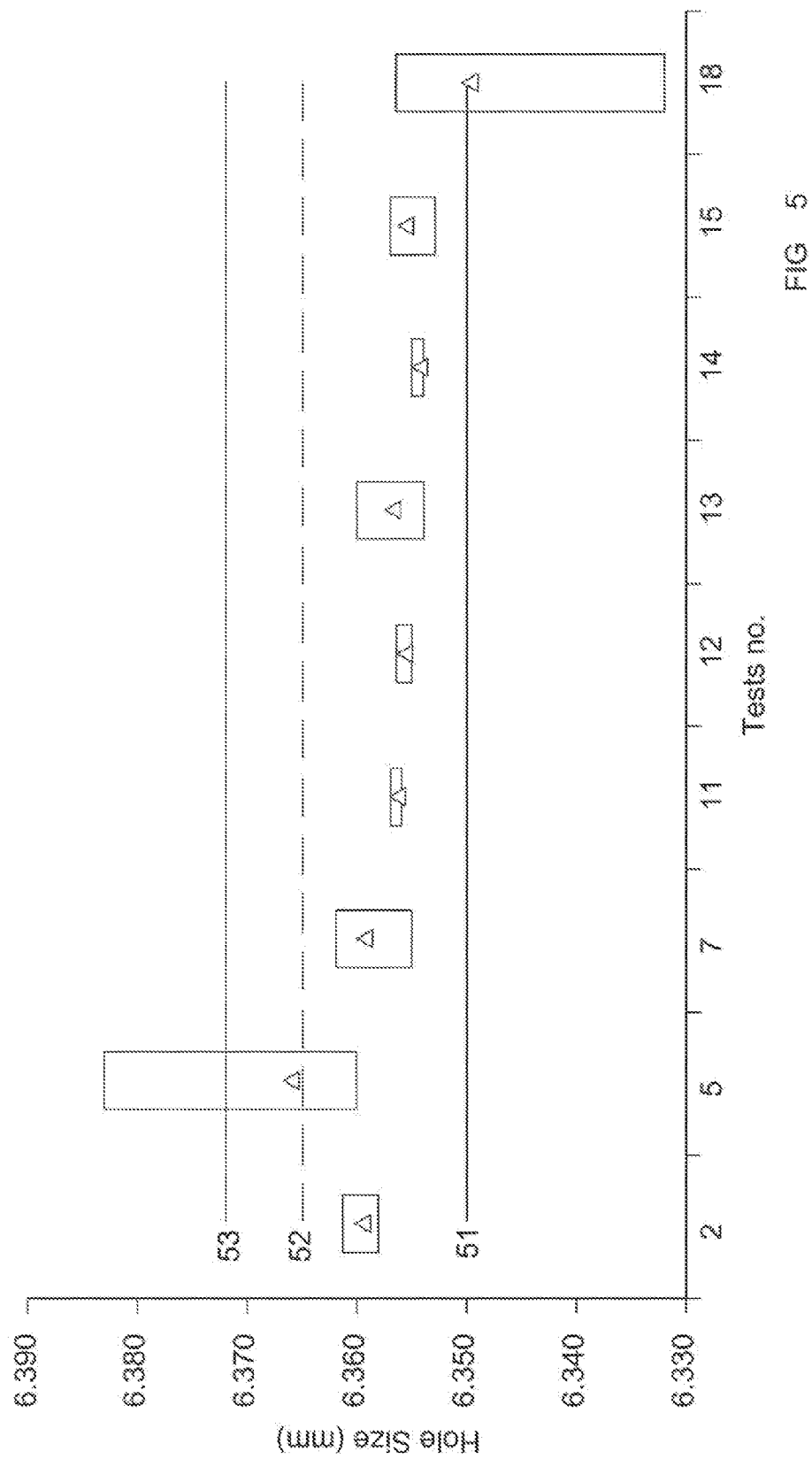
FIG. 5 is a graph showing the hole size spread produced by a 20° constant helix drill for drill speeds and feeds shown in Table 1.
Figure 6:
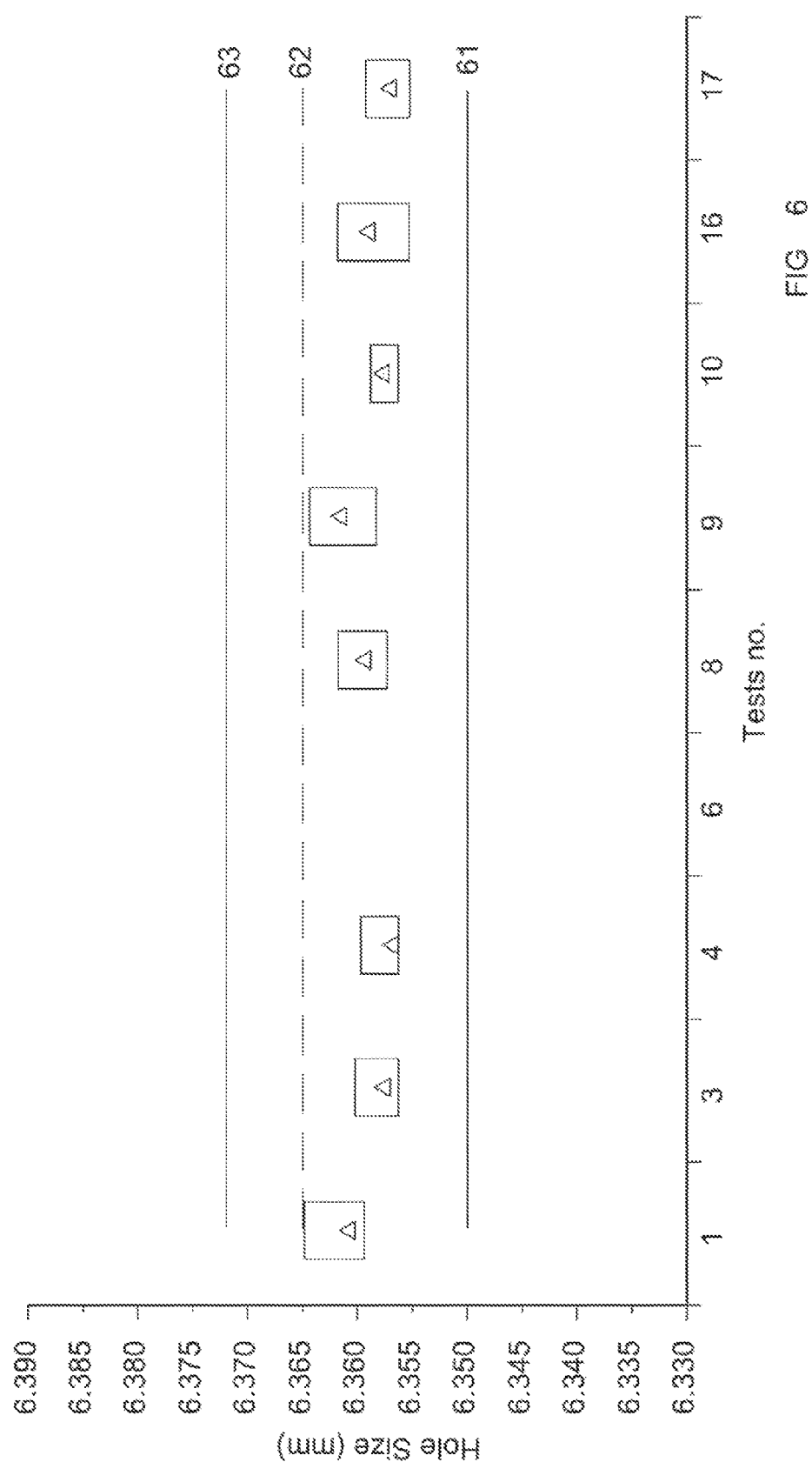
FIG. 6 is a graph showing the hole size spread produced by a 50° constant helix drill for drill speeds and feeds shown in Table 1.

FIGS. 5 and 6 show the spread of hole size obtained at different speeds and feeds for 20° helix and 50° helix drills respectively. FIG. 6 shows that across all test conditions the 50° constant helix drill formed holes with size within tolerance identified by line 62, corresponding to H7. FIG. 5 shows that in same conditions, the 20° helix drill did not produce holes with size within tolerance specified by either line 52 or 53, corresponding to H7 and H8 respectively, across the range of speed and feed tested. These results show that a large helix angle, as specified in the claims consistently show hole size within tolerance and this is not the case for drills having a smaller helix angle. This experiment illustrates an advantage of the large helix angle.

The invention claimed is:

1. A twist drill for drilling composite materials, the twist drill comprising:
   a shank;
   a drill body;
   a drill tip including a cutting edge and at least two chisel edges, the at least two chisel edges comprising a primary chisel edge and a secondary chisel edge, wherein the secondary chisel edge has a secondary chisel angle of 145° to 165°, the drill tip also having a point angle of 70° to 100° and a primary facet extending behind the cutting edge and a secondary facet extending behind the primary facet, wherein a relief angle of the primary facet is 15° to 25°, and a relief angle of the secondary facet is 15° to 30°; and
   a flute extending from the drill tip to the drill body, the flute having a constant helix, and a helix angle of the flute being selected from the range 45° to 55°.

2. The twist drill according to claim 1, wherein the drill tip has an axial rake angle of 5° to 8°.

3. The twist drill according to claim 1, wherein the drill tip has a point angle of 85° to 88°.

4. The twist drill according to claim 1, wherein the secondary chisel angle is 145° to 155°.

5. The twist drill according to claim 1, wherein the flute has a right hand helix.

6. A method of drilling composite material comprising fibres, wherein the method includes the step of drilling the composite material using a twist drill comprising a shank; a drill body; a drill tip including a cutting edge and at least two chisel edges, the at least two chisel edges comprising a primary chisel edge and a secondary chisel edge, wherein the secondary chisel edge has a secondary chisel angle of 145° to 165°, the drill tip also having a point angle of 70° to 100° and a primary facet extending behind the cutting edge and a secondary facet extending behind the primary facet, wherein a relief angle of the primary facet is 15° to 25°, and a relief angle of the secondary facet is 15° to 30°; and a flute extending from the drill tip to the drill body, the flute having a constant helix, and a helix angle of the flute being selected from the range 45° to 55°.

7. The method according to claim 6, wherein the composite material is carbon fibre reinforced plastic (CFRP) or glass fibre reinforced plastic (GFRP).

8. The method according to claim 7, wherein the step of drilling comprises automated drilling.

9. The method according to claim 7, wherein the method is a method of stack drilling.

10. The method according to claim 9, wherein the stack comprises CFRP and GFRP.

11. The method according to claim 9, wherein the stack comprises CFRP and Al.

12. A regrinding method comprising the step of regrinding a twist drill so as to form a twist drill having a shank; a drill body; a drill tip including a cutting edge and at least two chisel edges, the at least two chisel edges comprising a primary chisel edge and a secondary chisel edge, wherein the secondary chisel edge has a secondary chisel angle of 145° to 165°, the drill tip also having a point angle of 70° to 100° and a primary facet extending behind the cutting edge and a secondary facet extending behind the primary facet, wherein a relief angle of the primary facet is 15° to 25°, and a relief angle of the secondary facet is 15° to 30°; and a flute extending from the drill tip to the drill body, the flute having a constant helix, and a helix angle of the flute being selected from the range 45° to 55°.

13. A method of manufacturing a twist drill for drilling composite materials, the method comprising the steps of:
(i) fluting a drill blank to produce a helical flute with a constant helix angle in the range of 45° to 55° from the start to the end of the flute;
(ii) forming a cutting edge at the end of the flute;
(iii) forming a drill tip to form a point angle of 70° to 100° and a primary facet extending behind the cutting edge and a secondary facet extending behind the primary facet, wherein a relief angle of the primary facet is 15° to 25°, and a relief angle of the secondary facet is 15° to 30°;
(iv) forming a primary chisel angle; and
(v) forming a secondary chisel angle in the range 140° to 165°.

* * * * *